C. P. ASTROM.
MACHINE FOR STRAIGHTENING RODS.
APPLICATION FILED MAY 2, 1914.

1,287,820.

Patented Dec. 17, 1918.
5 SHEETS—SHEET 1.

Witnesses:
J. D. Connolly Jr.
Arthur Allen Jr.

Inventor
Carl P. Astrom,
By his Attorneys
Edwards, Sager & Wooster.

C. P. ASTROM.
MACHINE FOR STRAIGHTENING RODS.
APPLICATION FILED MAY 2, 1914.

1,287,820.

Patented Dec. 17, 1918.
5 SHEETS—SHEET 2.

Witnesses:

Inventor
Carl P. Astrom,
By his Attorneys
Edwards, Sager & Wooster

C. P. ASTROM.
MACHINE FOR STRAIGHTENING RODS.
APPLICATION FILED MAY 2, 1914.
1,287,820.
Patented Dec. 17, 1918.
5 SHEETS—SHEET 3.
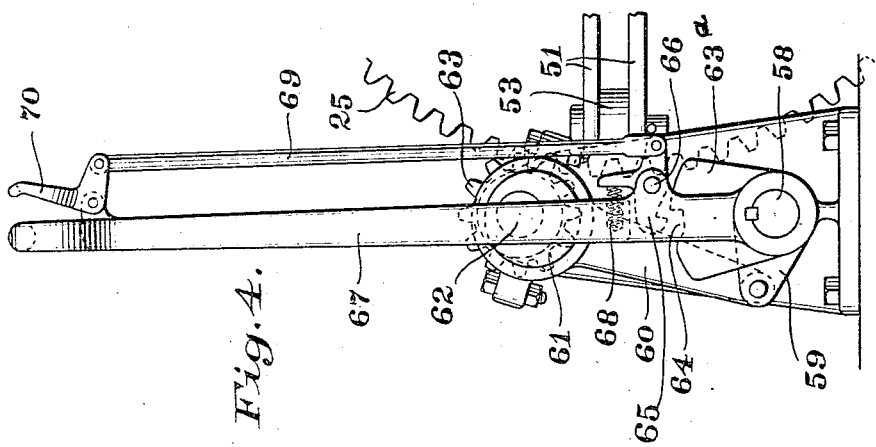
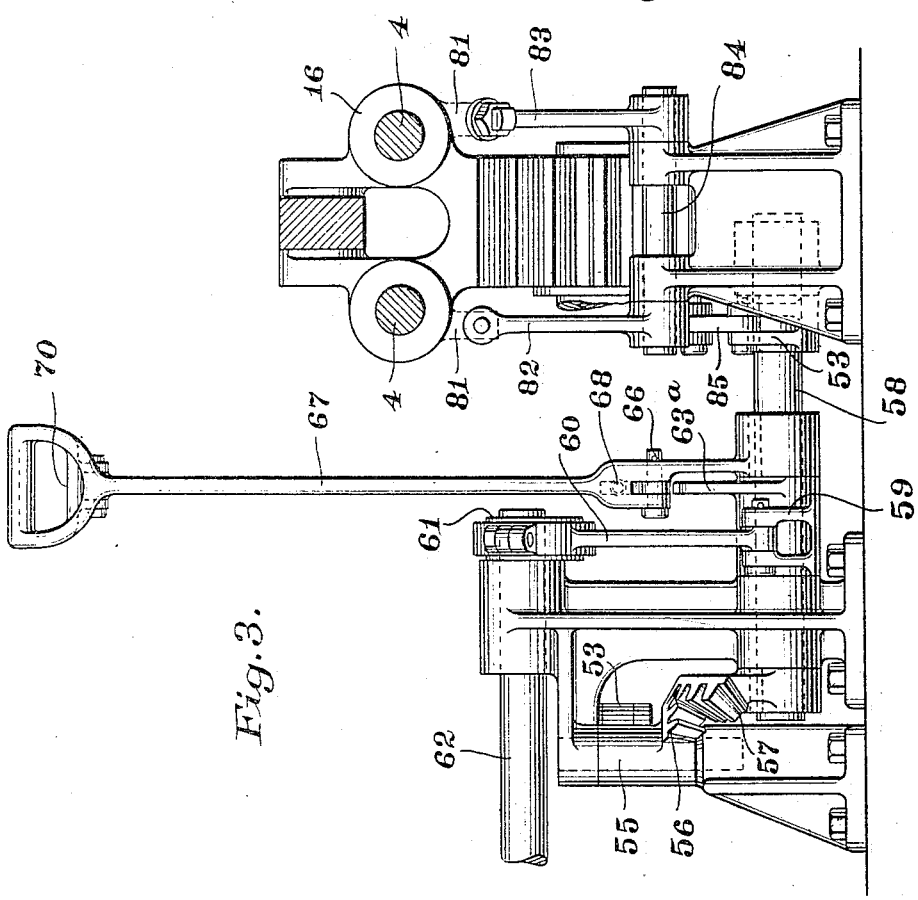
Witnesses:
J. D. Connolly Jr.
Arthur Allen Jr.
Inventor
Carl P. Astrom,
By his Attorneys
Edwards, Sager & Wooster.

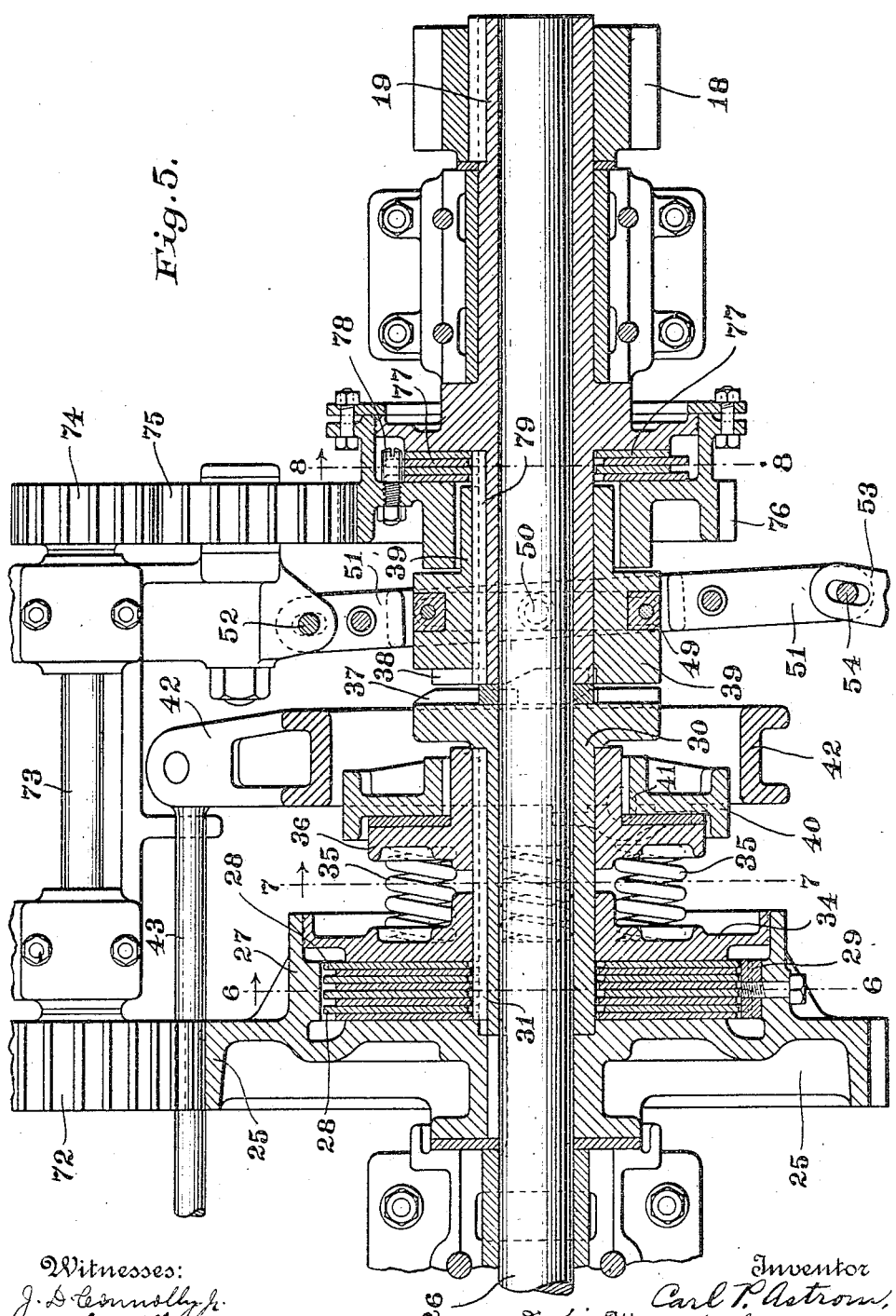

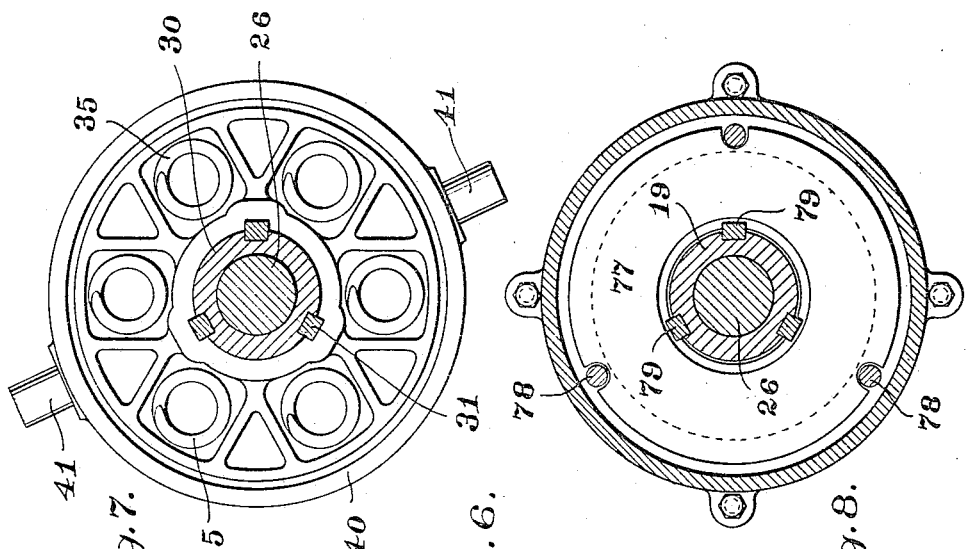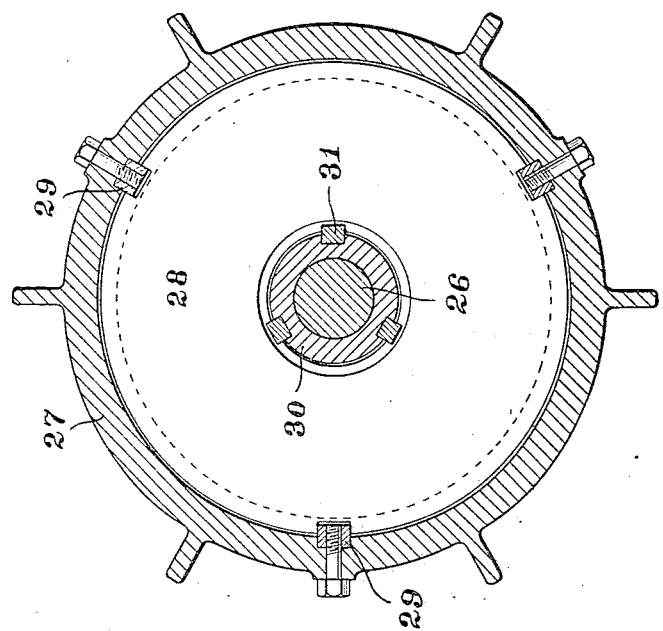

UNITED STATES PATENT OFFICE.

CARL P. ASTROM, OF EAST ORANGE, NEW JERSEY, ASSIGNOR TO M. H. TREADWELL COMPANY, A CORPORATION OF NEW YORK.

MACHINE FOR STRAIGHTENING RODS.

1,287,820.   Specification of Letters Patent.   Patented Dec. 17, 1918.

Application filed May 2, 1914. Serial No. 835,788.

*To all whom it may concern:*

Be it known that I, CARL P. ASTROM, a citizen of the United States, residing at East Orange, in the county of Essex and State of New Jersey, have invented certain new and useful Improvements in Machines for Straightening Rods, of which the following is a full, clear, and exact specification.

This invention relates to rod mills, and has particular reference to a machine for straightening long lengths of wire or rods, as they are delivered from the rolls. Rolled material such as wire or rods does not come from the rolls in straight lengths, but is bent or warped irregularly, and requires to be straightened while still hot, before it is moved to storage, or for the next operation.

The present invention has for its object to provide an improved rod straightening mill, wherein power will preferably be derived from a continuously running rotary motor, together with means to intermittently apply tension to rods in succession. The general operation of the machine is that one end of the rod to be straightened is gripped in a stationary jaw clamp, and the other end is gripped in a movable clamp, which moves at such a rate as to practically snap the rod straight, whereupon the clamp is released and the rod cooled. In operating such a machine, provision must be made to prevent the application of such a stretching force to the rod as would break it, or such an insufficient force as would not give it the requisite snap, and also there must be provision for quickly returning the movable clamp member for the next rod. At the same time, movable controlling means for the several clutches and controlling devices must be provided so that the machine will at all times be under the control of the operator and capable of quickly releasing the rod before it is damaged.

In the accompanying drawings is shown a machine embodying the above described general objects, wherein there is a continuously running motor, which drives through releasable connections the movable jaw, together with jaw controlling means and a quick return mechanism, these several instrumentalities being under the control of one operator. The operation of the machine is to first cause the movable jaw to grip the rod, then a clutch is closed to move the jaw and snap the rod, then the clamp is released, the first clutch released and a separate return clutch closed to bring the quick return mechanism into operation, and then the action is repeated upon the next rod. In order to effect proper operation, the tension must be regulated so as not to break the rod, which is done by means of a friction drive mechanism adjustable to transmit a certain power and the return is made through a similar friction drive mechanism and back gearing so that the parts are not strained. Inasmuch as the forward motion of the movable jaw during the stretching operation is arrested by disconnecting the power while the load is on, this clutch must be thrown at just the proper instant by power means under the control of the operator. Otherwise, the jaw would travel too far and either break the rod or stretch it to such an extent as to reduce its strength and size. In order to maintain sufficient power from the rotating motor to operate the intermittent heavy loads, a fly-wheel is employed which is in geared relation to the movable jaw, and of such weight as to store the necessary energy.

Fig. 3 shows the control mechanism in elevation;

Fig. 4 is a side view;

Fig. 5 is a plan view partly in section showing the main driving connections;

Figs. 6, 7 and 8 are details of the friction transmission disks.

Figure 1:
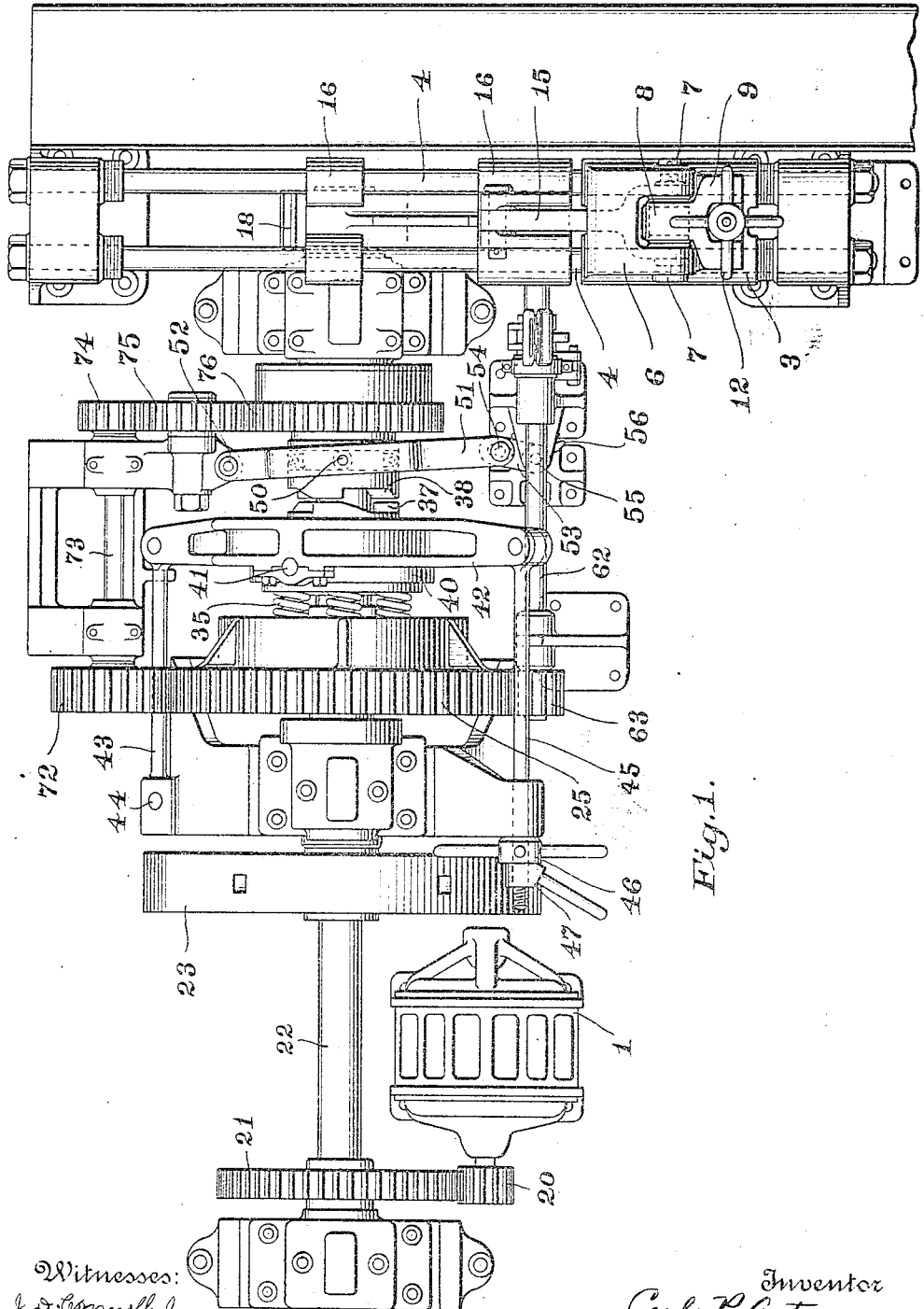
Figure 1 is a plan view of the machine.
Figure 2:
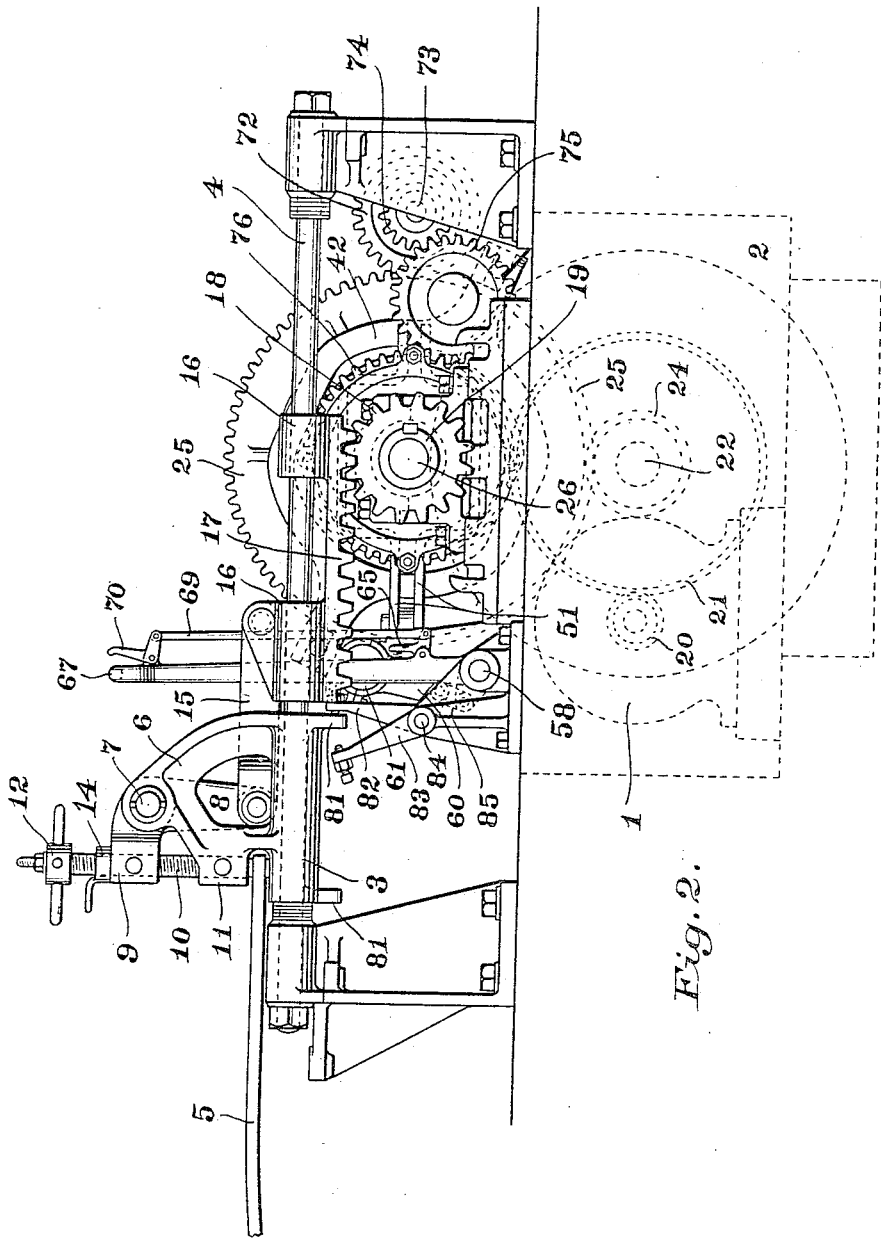
Fig. 2 is an elevation.

Referring to Figs. 1 and 2, 1 represents the driving motor, which may be mounted below the machine in a pit 2, and 3 represents the movable jaw sliding on guides 4 and straightening the rod 5. The jaw slide 3 comprises an upwardly extending forked arm 6 having pivoted therein at 7 a bell crank lever 8. The short end 9 of the bell crank lever carries a movable jaw member 10 and passes through the forward portion 11 of the up-right 6, constituting a guide, and bears on the end of the rod 5. By turning the hand wheel 12, the movable jaw member 10 is adjusted for various thicknesses of rods and can be held by a set nut 14. The rear depending end of the bell crank lever 8 is connected by a link 15 to a slide 16 reciprocating on rods 4 and the lower surface of this slide is provided with a rack 17, which is operated by a gear 18 on shaft 19. When the shaft 19 is revolved in one direction, the jaw 3 will be moved and the rod 5 simultaneously gripped and stretched, while a revolution of the shaft 19 in the opposite direction will return the jaw ready for the next rod. It will be seen that the power to move the rack is applied directly to the rod through the bell crank lever, so that the heavier the rod the greater the force with which it will be clamped owing to the greater pull required to give it a predetermined stretch.

The shaft 19 is driven in either direction from the motor 1 by connections which will now be described. The motor shaft carries a pinion 20, which meshes with a large gear 21 on the shaft 22, which shaft carries a flywheel 23 intermediate its ends and at its far end carries a pinion 24 which meshes with a large gear 25 immediately above pinion 24.

The large gear 25 is keyed to a shaft 26, and is provided with a hollow hub 27 carrying a series of alternating clutch disks 28 keyed thereto by removable keys 29. The alternating disks 28 are keyed to sleeve 30 by keys 31. The driving pressure from the gear 25 through the disks 28, to sleeve 30 is produced by expansion springs 35, interposed between sliding plate 34 and a sliding abutment plate 36 keyed to sleeve 30. The end of the sleeve 30 is provided with clutch teeth 37, which engage with coöperating teeth 38 on a sliding clutch element 39, which is keyed to the shaft 19. Thus the drive from gear 25 to pinion 18 to stretch the rod is through clutch disks 28, sleeve 30, clutch 37, 38. The clutch disks 28, and the springs 35 limit the power transmitted, and to this end it is necessary to variably control the pressure of springs 35 by moving the abutment plate 36 toward or from plate 34. This is effected by means of a ring 40 carrying trunnions 41, which are pivoted in a yoke 42, one end of which is pivoted to the frame by link 43 at 44 and the other end adjustably pivoted to the frame on the opposite side by link 45 and set screws 46, 47. By shortening the link 45, the pressure of the springs 35 is increased, and by lengthening the link 45 the pressure of the springs is decreased, consequently varying the power transmitted through clutch 37, 38, according to the length of link 45.

The parts are shown in neutral position, with the clutch 38 disengaged, and the mechanism for operating the sleeve 39 and clutch 38 will now be described. The sleeve 39 is provided with a groove containing a collar 49, having trunnions 50 which engage a shifting lever 51 pivoted at one end on the frame at 52, and at the other end connected to a short arm 53 by pin 54 carried on a vertical rock shaft 55. This rock shaft 55 carries a segmental bevel gear 56, which meshes with a similar bevel gear 57 on a horizontal rock shaft 58. The rock shaft 58 carries an arm 59 which is connected to a pitman 60, which is driven by an eccentric 61 on shaft 62, which is driven by pinion 63 meshing with gear 25. The arm 59 is loose on shaft 58, as is also an oscillating dog 63ª. The dog 63ª has a notch 64 which can be engaged with a latch 65 pivoted at 66 on controlling lever 67, the latch 65 being normally held out of engagement with notch 64 by spring 68. The lever 67 is keyed to shaft 58, and the latch 65 is controlled by link 69 and bell crank lever 70. The shaft 58 and the arm 53 connected to the main clutch 38 is thus not actuated until the operator lifts link 69 and throws latch 65 in engagement with notch 64 on dog 63ª. Thus, the clutch is mechanically released when the operator presses the lever 70 to the left in Fig. 4. When the dog 63ª oscillates to the right, it lifts the latch 65 without throwing clutch 38 in again.

The reversing mechanism is thereupon rendered effective to reverse the rotation of pinion 18 and shaft 19. The pinion 25 meshes with pinion 72 on counter-shaft 73 which carries a second pinion 74 meshing with an idler 75 which meshes with a large reverse pinion 76, which contains a reverse driving friction clutch 77, of alternating disks, to transmit the driving force to shaft 19. This is effected by the operator pulling lever 67 to the left in Fig. 4, whereby the right end of clutch collar 39 forces the disks 77 together, and thereby returns the carriage after the rods have been stretched. At the same time, the rod clamp releases the rod. The reverse clutch is shown in Fig. 8, in which it will be seen that one set of disks 77 is connected by studs 78 to the interior of gear 76 while the other set is connected by keys 79 to sleeve 19.

Means are also provided for automatically limiting both the stretching and the return movements, this means being actuated by the carriage 3. As herein shown, the lugs 81 on carriage 3 operate two arms 82, 83, carried on rock shaft 84, which rock shaft 84 is connected by link 85 to arm 53' of rock shaft 58. Thus when the carriage moves to the right in Fig. 2, the lug 81 strikes lever 82 and throws lever 67 to the left, and thus opens the main clutch 38. When the carriage 3 moves to the left in Fig. 2, the lug 81 strikes lever 83 and moves lever 67 to the right, thereby throwing the main clutch 38 to neutral position and stopping the reverse by relieving the pressure on disks 77.

From the foregoing description, the operation of the movable jaw mechanism for applying a stretching force to a rod will be understood. Of course, a fixed jaw is used at the other end, and in practice there will be one man to operate the movable jaw and insert the rods and another man to insert rods in the fixed jaw and to hold them while the movable jaw operates. By the present invention, a continuously running rotary motor is employed to drive a reciprocatory stretching jaw, and frictional driving mechanisms are interposed so that only a predetermined stretch can be applied to the rod. The movable jaw is releasable either automatically by power, or at any time under the control of the operator, which is an important feature, inasmuch as the operator might not alone be able to quickly throw out a clutch carrying a heavy load, but it will necessarily be thrown out when it is coupled to the driving motor.

Various modifications and changes in the specific details herein described may be made without departing from the scope of the appended claims.

Having thus described my invention, what I declare as new and desire to secure by Letters Patent of the United States is:—

1. The combination with a movable rod stretching carriage, of a releasable clutch connection for driving said carriage in one direction, and frictional power transmitting means between the prime mover and said carriage independent of said clutch connection.

2. The combination with a movable rod stretching carriage, of a continuously running prime mover, a releasable clutch connection for driving said carriage in one direction, frictional power transmitting means between the prime mover and said carriage independent of said clutch connection, and means for reversing said carriage controlled by said clutch.

3. The combination with a movable rod stretching carriage, of a continuously running prime mover, means including a clutch for manually controlling the direction of movement of the carriage, and means for connecting said clutch to said prime mover to open said clutch.

4. The combination with a movable rod stretching carriage, of reversible driving means, a reversing clutch, and means for connecting said clutch to the driving means, to open said clutch.

5. In a rod straightening machine, the combination with a reciprocatory rod stretching jaw, of a driving means rotating in one direction, and forward and quick return gearing between said driving means and said jaw and comprising a slip friction clutch to limit the tension applied by said jaw.

6. The combination with means for stretching one end of a rod, of motor driven movable means for gripping the other end of the rod and snapping it taut, means automatically stopping the movement of said gripping means upon a predetermined tension independently of the driving motor, and manually controlled means for disconnecting said movable rod gripping means.

7. The combination with a movable carriage, of a rod gripping jaw connected thereto to be actuated and reciprocated by the carriage, frictional means for driving the carriage to close the jaw and limit the power applied thereto, power means for stopping the carriage, and means for reversing the carriage and opening the jaw.

8. The combination with a movable carriage, of continuously running driving means, means including a clutch for reversing said carriage, a rod stretching jaw connected thereto to be actuated and reciprocated by the carriage, said jaw being closed when the clutch is closed, and means for connecting said clutch and said driving means to open the clutch and jaw and stop the carriage.

9. The combination with a movable carriage, of a movable rod stretching jaw connected thereto to be actuated by opposite movements of the carriage, means for controlling the carriage, and means for automatically opening the jaw after a predetermined movement.

10. The combination with a movable carriage, of a movable rod stretching jaw connected thereto to be actuated by opposite movements of the carriage, means for actuating the carriage, and means for automatically applying power to disconnect the carriage while under load.

11. The combination with a movable carriage, of a movable rod stretching jaw connected thereto to be actuated by opposite movements of the carriage, means for actuating the carriage, manually controlled power means for disconnecting the carriage, and automatic means for disconnecting the carriage independently of said manual means.

12. The combination with a movable carriage, of a movable rod stretching jaw connected thereto, means for actuating the jaw, means for actuating the carriage, power means for disconnecting the carriage from the actuating means, and manual and automatic means for independently controlling said power means.

13. The combination with a movable carriage and a rod stretching jaw, of driving means, a main clutch for controlling the connection between the driving means and the carriage, and means for connecting the main clutch and the driving means to disconnect the carriage.

14. The combination with a rod stretching carriage, driving means, and a controlling clutch, of clutch actuating means, and a manually controlled connection between said driving means and said clutch actuating means.

15. The combination with a rod stretching carriage, driving means, and a controlling clutch, of clutch actuating means, and a manually controlled connection between said driving means and said clutch actuating means, comprising a vibrating dog, and a latch adapted to engage said dog.

16. The combination with power driven rod stretching means, of a clutch for operating said means in one direction to stretch a rod, and means for applying power from the driving means to open said clutch.

17. The combination with a rod clamping jaw, of means for adjusting the grip of said jaw, means connected to said jaw for bodily moving it to stretch a rod, a source of power connected to said means, and means for limiting the power transmitted to said clamp.

18. In a rod straightening machine, the combination with movable means for stretching a rod, of a source of power for said stretching means, and means for rendering said stretching means inoperative by a predetermined tension in the rod.

19. In a rod straightening machine, the combination with movable means for stretching a rod, of a source of power for said stretching means, and means for rendering said stretching means inoperative by a predetermined tension in the rod or by a predetermined movement of the stretching means.

20. The combination with a continuously rotating motor, and a flywheel, of a reciprocatory rod stretching jaw driven in both directions by said motor, separate frictional transmission devices, and a main clutch for controlling one or the other of said transmissions.

21. The combination with a continuously rotating motor, and a flywheel, of a reciprocatory rod stretching jaw driven in both directions by said motor, separate frictional transmission devices, and a main clutch for controlling one or the other of said transmissions, and means for connecting the clutch to said motor during forward movement of said jaw to open the clutch by power.

22. The combination with means for clamping one end of a rod, of motor driven movable means for gripping the other end of the rod and snapping it taut, means automatically stopping the movement of said gripping means upon a predetermined tension independently of the driving motor, manually controlled means for disconnecting said movable rod gripping means, and manually controlled reversing mechanism.

23. The combination with a reciprocatory rod stretching jaw, of means rendering said jaw self closing and self opening according to its direction of reciprocation, a driving means, and automatic means for stopping the movement of said jaw at each end of its reciprocation.

24. The combination with means for holding one end of a rod, of motor driven movable means for gripping the other end of the rod and snapping it taut, means automatically stopping the movement of said gripping means upon a predetermined tension independently of the driving motor, manually controlled means for disconnecting said movable rod gripping means, and reversing mechanism controlled by said means for disconnecting said rod gripping means.

25. The combination with a motor, of a flywheel, a reciprocatory rod end gripper driven thereby, means for gripping the other end of a rod, an interposed clutch, a reversing clutch and reverse gear and means for controlling said clutches alternately.

26. The combination with a driving shaft, of a reciprocatory rod gripping and stretching carriage, and a friction clutch and a positive clutch in series between said motor and said carriage.

27. The combination of a driving shaft, of a reciprocatory rod gripping and stretching carriage, a friction clutch and a positive clutch in series between said motor and said carriage, a reversing gear, and means for opening said positive clutch and throwing in said reverse gear to reverse the carriage.

28. The combination with a driving shaft, of a reciprocatory rod gripping and stretching carriage, a friction clutch and a positive clutch in series between said motor and said carriage, a reversing gear, and means for opening said positive clutch and throwing in said reverse gear to reverse the carriage, said reverse gear including a friction drive.

In testimony whereof I affix my signature, in presence of two witnesses.

CARL P. ASTROM.

Witnesses:
J. S. WOOSTER,
G. N. KERR.

Copies of this patent may be obtained for five cents each, by addressing the "Commissioner of Patents, Washington, D. C."